United States Patent [19]

Creter, Jr. et al.

[11] Patent Number: 4,502,816
[45] Date of Patent: Mar. 5, 1985

[54] SHORELINE BREAKWATER

[75] Inventors: Frank E. Creter, Jr., Calverton, N.Y.; Richard E. Creter, Oldbridge Township, Mercer County, N.J.

[73] Assignee: Creter Vault Corp., Flemington, N.J.

[21] Appl. No.: 508,327

[22] Filed: Jun. 27, 1983

[51] Int. Cl.³ .............................................. E02B 3/04
[52] U.S. Cl. ...................................... 405/30; 405/21; 405/25
[58] Field of Search .................................. 405/28-35, 405/15, 16

[56] References Cited

U.S. PATENT DOCUMENTS 3,386,250 6/1968 Katayama ............................ 405/33
4,367,978 1/1983 Schaaf et a. ...................... 405/35 X

FOREIGN PATENT DOCUMENTS 1373090 8/1964 France ................................. 405/30
2367146 5/1978 France ................................. 405/30
877057 9/1961 United Kingdom ................. 405/30

Primary Examiner—Dennis L. Taylor
Attorney, Agent, or Firm—Hopgood, Calimafde, Kalil, Blaustein & Judlowe

[57] ABSTRACT

An artificial reef which protects the shoreline from erosion is created by placing in the surf zone, in side-by-side relation, reinforced concrete prisms having a gently sloping seaward face provided with parallel, transverse grooves which assist in dissipating wave energy and the release of water-borne sediments while minimizing secondary waves.

9 Claims, 3 Drawing Figures

SHORELINE BREAKWATER

The present invention is directed to a breakwater which can be located adjacent a shoreline to protect against erosion and which is made from transportable precast reinforced concrete shapes of special configuration.

BACKGROUND OF THE INVENTION AND THE PRIOR ART

Protection of the shoreline, whether it be along the ocean, a bay or sound, an estuary, a lake or other sizeable body of water, is a problem which has faced mankind for eons. Wave action against a shoreline can be a powerful destructive force. Combined tidal and wave action can increase the area of potential attack. Storms produce exaggerated and frequently unpredictable effects. Currents along shorelines can transport almost unbelievable amounts of sand or sediment from one point to another. With the apparently universal desire of people to erect buildings as close as possible to the water, shoreline erosion has become an extremely expensive proposition. In many cases, it is considered that the activity of builders has itself contributed to attack on the shoreline.

Many attempts have been made to provide local protection of the shoreline including permanent breakwaters, groins, rip-rap deposits, sandbags, concrete structures of various kinds, rubber tires, "longard" tubes and others. Permanent breakwaters have been successful but are so expensive that they can only be employed where governmental interests in protecting commercial harbors and the like can be brought to bear so that the necessary financing can be made available. Groins have been employed to obtain local protection with some success, but their use has resulted in increased erosive attack on adjacent properties due, inter alia, to diversion of the littoral current. Other devices have had only limited success. For example, in one test, installation on a bay communicating with the Gulf of Mexico, only the longard tube, which is made by filling a woven textile fiber back with pumped-in sand slurry, was effective in affording protection to the beach. Unfortunately, such devices are short-lived and susceptible to vandalism.

Improved and relatively inexpensive devices of improved longevity are still needed.

BRIEF DESCRIPTION OF THE INVENTION

The invention provides an offshore breakwater comprised of concrete modules having a triangular prismatic shape with three major parallelogram faces, of which the long face is the foot on which the module stands freely on the bottom. The seaward face forms an acute angle therewith on the rear or beachward face which in turn forms an included angle of less than 90° with the foot. The sides of the prismatic module are substantially triangular. The gently sloping seaward face which is substantially impermeable advantageously is provided with transverse, parallel grooves such that wave energy is absorbed and dissipated as the wave runs up the seaware face without creating secondary reflected forms of wave energy. The transverse grooves are shaped such that silt and sand trapped in them as the wave carrying the solid material runs up the seaward face will slide down the seaward face and add to solid material around the toe of the structure. The modules may be placed side-by-side on the bottom to form an artificial reef adjacent to shoreline.

DETAILED DESCRIPTION OF THE INVENTION

Figure 1:
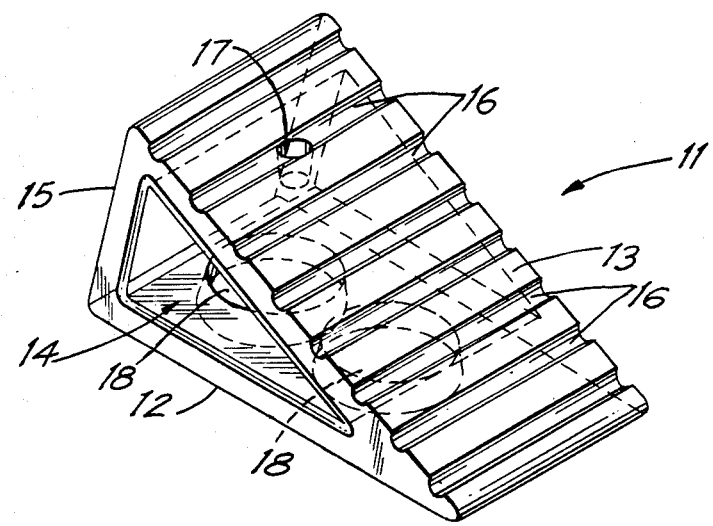
FIG. 1 depicts in perspective the prismatic module provided in accordance with the invention.

The precast, reinforced concrete modules of the invention will be described particularly in conjunction with the drawing which depicts the shape and function of the device provided in accordance with the invention. Thus, referring to FIG. 1, reference character 11 identifies the right triangular reinforced concrete module to which the invention is directed. The acute included angle $\theta$ between the foot or bottom face 12 and the gently sloping seaward face 13, is preferably about 28°. The slope between the seaward face 13 and the foot 12 may be between about 1:4 and about 3:4 such that the angle $\theta$ may be in the range of about 14° to about 37°. The rearward or beachward face 15 forms an angle less than 90° with the foot 12. The transverse grooves 16 extending across the seaward face 13 in parallel relation are a special feature of the invention which aid further in dissipating wave energy as the incoming wave front ascends the seaward face 13. A plurality of grooves is provided. A washboard configuration for the seaward face is also useful. A lifting hole 17 is provided to enable easy crane attachment to a completed module. In order to save weight, the module is cored out from side to side as more particularly shown at 14 in FIG. 2. The foot 12 may also be cored out as shown at 18 in each of FIGS. 1 and 2. The holes in the foot also assist to anchor the module when they become filled with accreted sediment. The foot 12 should be at least twice as long as the height 19 of the module in order to contribute stability against wave pounding on the seaward face 13. A low center of gravity is also contributed thereby, whereby the module does not move under wave pounding. Installation of the modules without foundations or matting is also thus facilitated, thereby reducing the cost of shoreline protection.

Figure 2:
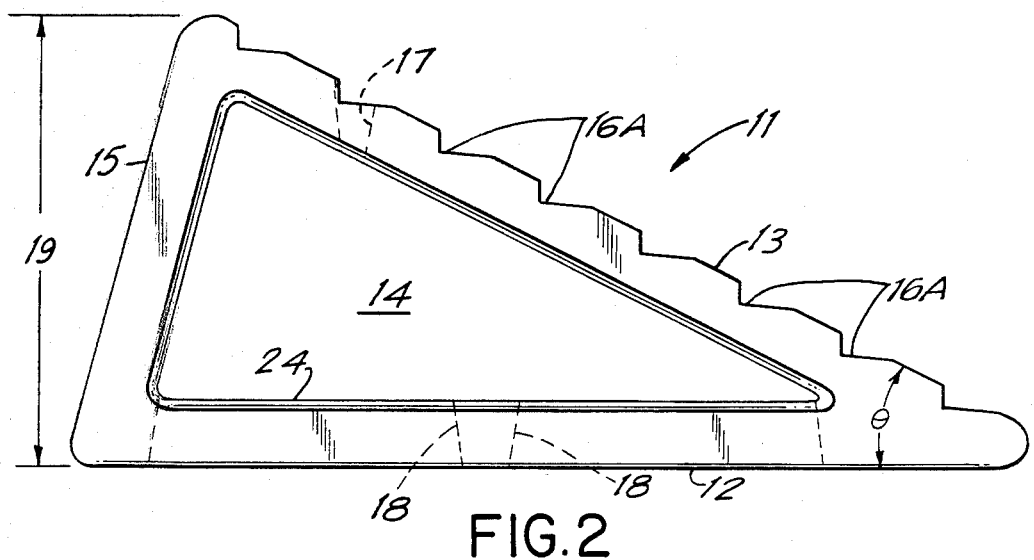
FIG. 2 depicts the side view of a concrete prismatic module provided in accordance with the invention.
Figure 3:
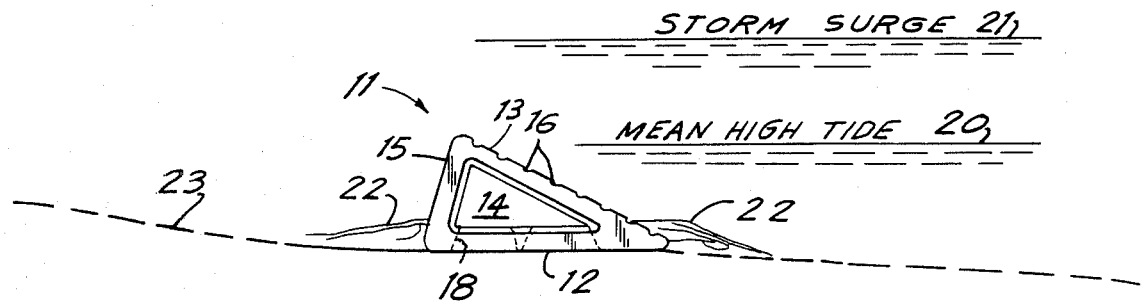
FIG. 3 depicts in longitudinal section the installation adjacent a shoreline of the device provided in accordance with the invention.

FIG. 3 illustrates installation of an assembly of modules 11 in side-to-side relation adjacent a shoreline. In tidal waters the modules are placed on the bottom 23 in water which is shallow at low tide. At high tide 20 the modules may be overtopped by wave action. FIG. 3 may further be exemplified in conjunction with a reinforced concrete module 8 feet 6 inches long in the foot, four feet high, four feet wide and with an included angle $\theta$ of 28°. The module is cored out side to side with a 1 inch draft (indicated at reference character 24 in FIG. 2) from center to edge facilitating withdrawal of the segmented mold parts and the foot is also cored out as illustrated in FIGS. 1 and 2. Average concrete thickness is about 6 inches and each module weighs about 4200 pounds. Modules 11 are to be placed side-by-side in groups of 8 to 15, more or less, with passages betweeb each group. Groups are to be placed in the surf zone in water 3 to 4 feet deep at mean high tide. Wave overlapping occurs from wave action and storm surge 21. Toe scour does not occur either on the beach side or the seaward side of the modules and sediment 22 gradually accretes on both seaward and landward sides. Actual burial of the module groupings can occur under optimum conditions. Modules of the design described can be placed offshore by helicopter. Modules of different sizes can of course, be used. The modules, which are preferably right angled prisms, may be placed in side-by-side relationship with their respective seaward faces in substantial alignment.

In consideration of the cost of an offshore installation as contemplated by the invention, high standards should be observed in pouring the modules. In particular, corrosion-resistant reinforcement such as pre-stressed polypropylene synthetic fibers and epoxy-coated reinforcing bar should be used in ample and appropriate amounts. Concrete having a strength of 5000 psi with a slump of 3 inches, made using Type 5 cement and 4% air entrained with pozzolan should be used. Generous chamfer should be provided for all edges. With quality construction, modules in accordance with the invention will last 50 years even in salt water.

While modules groupings may be placed substantially parallel to the shoreline they may also be placed as groupings at an angle to the shoreline as indicated by prevailing local conditions including wind and current.

The term "triangular" is used herein in the broad sense. For example, the sides need not be strictly triangular so long as a gently sloping seaward face is provided as described herein and as illustrated in the drawings.

Although the present invention has been described in conjunction with preferred embodiments, it is to be understood that modifications and variations may be resorted to without departing from the spirit and scope of the invention, as those skilled in the art will readily understand. Such modifications and variations are considered to be within the spirit and scope of the invention and appended claims.

What is claimed is:

1. A concrete module for a shoreline breakwater adapted for placement in the surf zone comprising a triangular prismatic shape having three major parallelogram faces, a long face to be the foot, a face forming an acute angle with said foot so as to form in use a gently sloping seaward face, and a beachward face forming with said foot an included angle less than 90°, with the sides of said prism being substantially triangular, said seaward face having a plurality of transverse parallel grooves indented therein, whereby wave energy is dissipated as waves run up said seaward face, said grooves being shaped such that sand-like solid material carried up said seaward face by wave action will slide down said seaward face.

2. A prismatic shape in accordance with claim 1 which is hollowed out from side to side, with the concrete thickness measured perpendicular to each of said faces being substantially equal.

3. A prismatic shape in accordance with claim 2 wherein said base face has cored-out holes whereby, when said prismatic shape is set free-standing on the bottom, silt can fill said holes to assist in anchoring said shape in the water.

4. A prismatic shape in accordance with claim 1 wherein the slope of said seaward face with respect to said bottom face is about 1:4 to about 3:4.

5. A breakwater located in the surf zone adjacent a shoreline and comprising a plurality of prismatic shapes as in claim 1 set side-by-side freestanding in the water with their respective seaward faces in substantial alignment.

6. The method for protecting a shoreline against erosion which comprises placing, in side-by-side relation, in the surf zone adjacent said shoreline a plurality of concrete modules having the configuration of a triangular prism, with the long parallelogram face of said prism being placed on the bottom, the seaward face of said prism being at an acute angle to said bottom face so as to present a gentle slope to incoming waves and with the beachward face of said prism being at an angle less than 90° to said bottom face, said modules constituting a reef.

7. The method in accordance with claim 6 wherein said seaward face is provided with a plurality of parallel transverse grooves to assist in dissipating wave energy and the avoidance of reflected waves as the waves climb said gently sloping seaward face.

8. The method in accordance with claim 6 wherein the included acute angle between said seaward face and said bottom face of said prism is about 14° to about 37°.

9. The method in accordance with claim 8 wherein said included angle is about 28°.

* * * * *